Oct. 11, 1932.     C. H. A. F. L. ROSS     1,882,164
FLUID REACTIVE SURFACE
Filed May 8, 1931     3 Sheets-Sheet 1

Inventor
CHARLES H. A.F.L. Ross
By Semmes & Semmes
Attorneys

Oct. 11, 1932.　　C. H. A. F. L. ROSS　　1,882,164
FLUID REACTIVE SURFACE
Filed May 8, 1931　　3 Sheets-Sheet 2
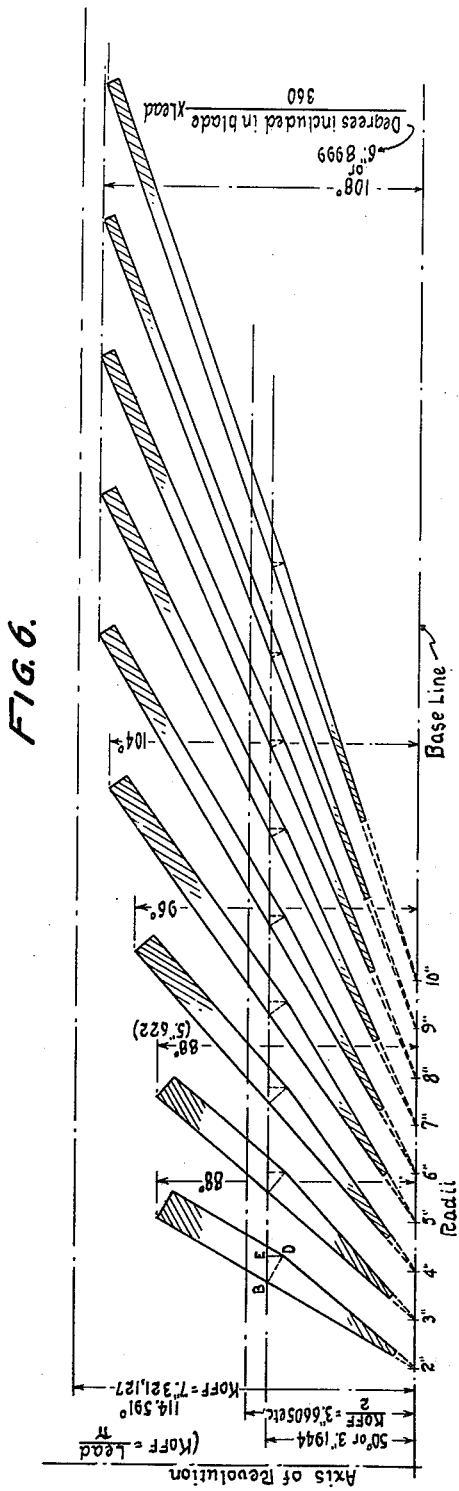
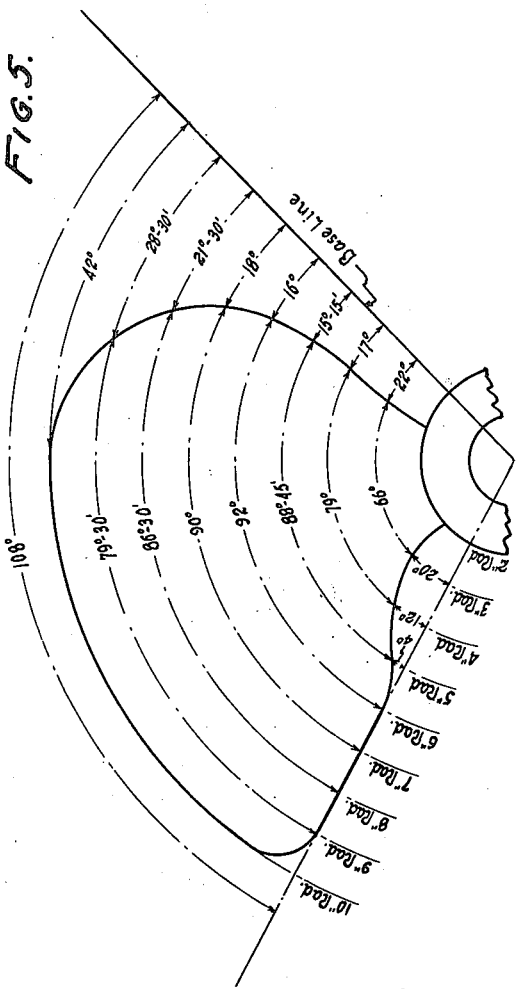
Inventor
CHARLES H.A.F.L. ROSS
By Semmes & Semmes
Attorneys

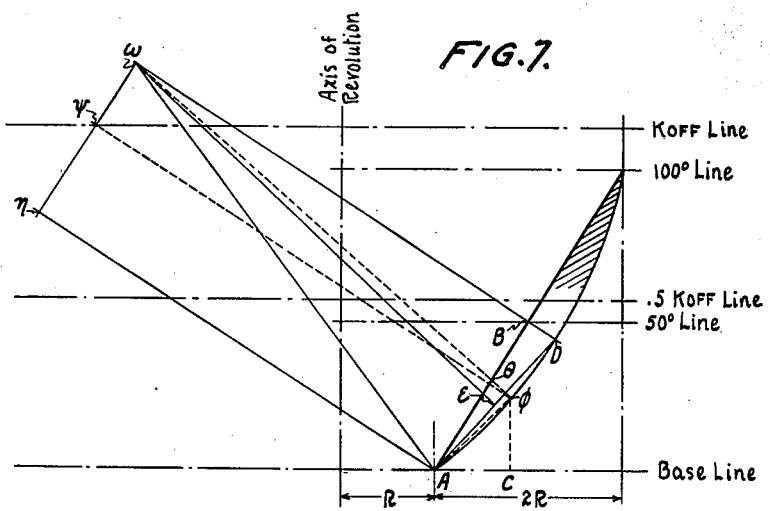
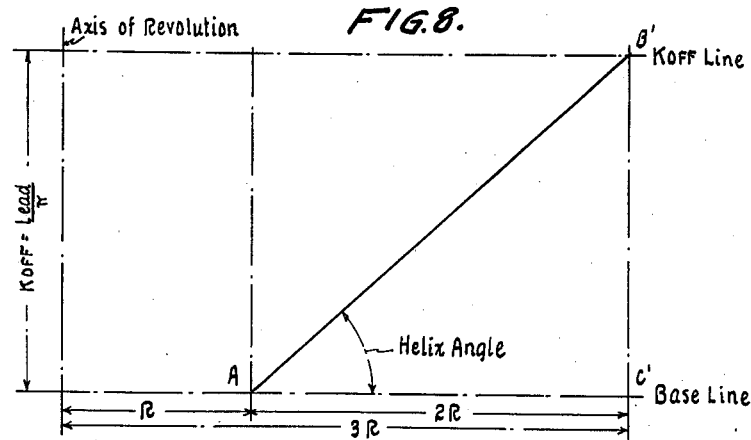
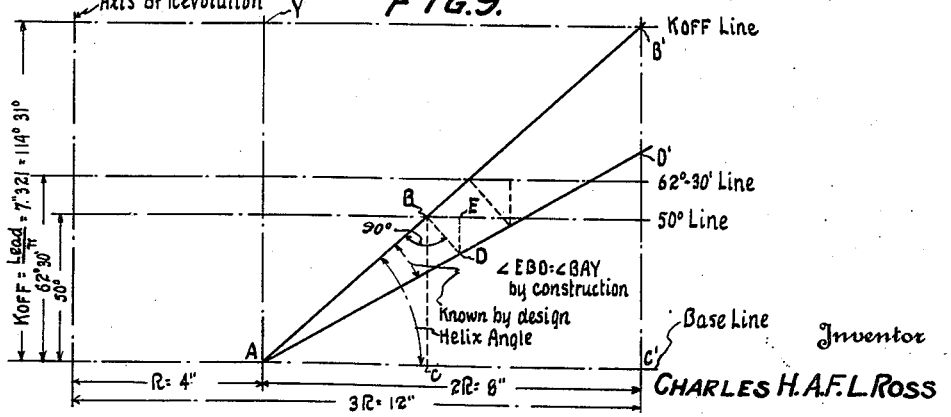

Patented Oct. 11, 1932.

1,882,164

UNITED STATES PATENT OFFICE

CHARLES H. A. F. L. ROSS, OF WASHINGTON, DISTRICT OF COLUMBIA

FLUID REACTIVE SURFACE

Application filed May 8, 1931. Serial No. 536,006.

This invention relates to fluid reactive surfaces, such as propeller blades, turbine blades and the like.

More particularly, it relates to a method of laying out such objects and to a method of checking the accuracy of their surfaces after they have been produced.

The invention also involves the method of determining and illustrating the developed arcuate sections of a propeller blade, or similar object, and the use of said developed sections in the production, checking, and study of the characteristics of such object. It is of particular utility with respect to such objects having a helical surface.

The invention further involves the means used to carry out this method.

One particular application of the invention is its use in marine propellers of the screw type, although the invention is broadly susceptible of use in turbines, fans, aeroplane propellers, fluid driven devices such as wind mills, and, in general, any device having a surface or surface driving, or being driven by a fluid.

In shipbuilding practice, the screw propeller dominates the field of propulsion devices for self-propelled ships, and its use is practically universal on ocean-going steamers. The use of the more cumbersome paddle wheels has been restricted to the relatively small ships on inland waters. Yet, while the screw propeller has a number of constructional advantages, it has been, as previously made, a relatively inefficient device, and wastes at least forty per cent of the power delivered to it by the driving engines.

In spite of the decided improvements in recent years in other parts of the driving mechanism, such as the use of steam turbines, the use of oil as fuel, etc., the screw propeller has remained a wasteful device. Such improvements as were made therein were largely the result of empirical or "cut and try" methods, and in some cases, the result of accidental discoveries. A typical example is the reduction in the number of the blades, which resulted from the observation that a steamer driven by a six-bladed propeller actually went faster after one of the blades was accidentally lost. Other developments were changes in area of the blades, contour or shape of the blades, etc., made with the hope of producing a more efficient propeller.

About the time when increased speeds were beginning to be used in steamers, it was noticed that there was a rapid loss of efficiency in the screw propellers at the higher speeds of rotation. This led to the pronouncement of the cavitation theory by Mr. Sidney W. Barnaby. This theory attributes the increased loss of efficiency to the "cavity" produced about the propeller after it reaches a certain speed, because of the inability of the fluid to flow fast enough to follow the blade. To avoid this effect, the use of a propeller with larger area was recommended.

Despite all these developments, however, the screw propeller has remained a relatively inefficient device. This is due, it is believed, to the ignoring of a fundamental factor in the manufacture of propellers. To fully understand this factor, a consideration of what I term the "wart" theory is necessary. It may be stated at the outset, however, that this theory is based upon an extensive study and observation of the action of propellers, and that the change of construction based thereon has resulted in an increased efficiency of some twenty-five to thirty per cent.

In present practice, the finished propeller is not required to be accurate within certain limits, and apparently the only requirement in this respect is that the surfaces of the blades look satisfactorily smooth to the eye. The industry seems to have accepted the conclusion that the screw propeller is inherently inefficient and that refinements in the accuracy of the surface are a mere waste of time.

In present propellers, therefore, even of the best grade, there exists inequalities in the surfaces, such as lumps or "warts". These form high spots and corresponding valleys in the surface, and have been found to have a decided effect upon the efficiency of the propeller. It is believed that when the propeller is driven at its usual speed, the water hits only these high spots, and skips past the valleys. The water does not follow the blade, and a decided loss in efficiency consequently results. The action may be compared to a solid tired automobile passing over a rough road at high speed, causing the driving wheels to be repeatedly in the air. During such times, the power delivered to the wheels is entirely lost, so far as propelling the vehicle is concerned, and the efficiency of the automobile is greatly reduced.

In view of this it is apparent that the accurate machining of the blades to form a smooth surface free from such "warts" produces an increased efficiency of the propeller. In actual practice, this increase is found to be not a mere minor increase such as might be expected from more accurate methods, but the unexpected result of an increase of some twenty-five to thirty per cent in efficiency.

The abolition of the turbulence arising from warts promotes the maintenance of the original even surface. In addition, the smooth passage of the water over such a surface so greatly reduces vibration that it becomes inappreciable, and this further increases the relative efficiency of the propeller.

It is accordingly a major purpose of my invention to provide a method for accurately laying out a propeller, or other similar object.

It is another object of my invention to provide an accurate method for determining and illustrating the developed arcuate sections of a propeller or other similar object.

It is a further object of my invention to provide a method of accurately determining the desired theoretical surface of a propeller blade or other similar object, in order that such surface may be reproduced on an actual propeller blade, and such actual blade checked by comparison thereto.

It is a further purpose of my invention to carry out the above objects with particular reference to a truly helical propeller blade.

With further reference to a truly helical propeller blade, it is a still further object of my invention to provide means for determining the helix angle and other correlated functions of any arcuate section of such a blade.

As indicated above, my invention is susceptible of use in aeroplane propellers or other propellers acting on a gaseous medium; in turbines, driven either by a liquid or a gas; in fans or blowers driving a gaseous medium; in devices driven by a fluid medium such as wind mills; or, in fact, any device having a moving surface cooperating with a fluid. Accordingly, while I show particularly in this specification a marine screw propeller as the means for carrying my invention into practical effect, I do not limit myself to this particular construction, which for purposes of explanation, has been made the subject of illustration.

It is accordingly a further and broader object of my invention to increase the efficiency of surfaces used in coaction with a fluid medium.

With these and other objects in view, which may be incident to my improvements, the invention consists in the parts, combinations, and methods hereinafter set forth, with the understanding that variations therein may be carried out without departing from the spirit of the invention or the scope of the appended claims.

In the drawings:

Figure 5 illustrates a plan of a propeller with the measurements to be taken therefrom indicated thereon.

Figure 6 illustrates the sections of a propeller developed according to my method.

Figure 7 illustrates a section of a propeller with a circularly curved back.

Figure 8 is a construction used to illustrate the Koff law.

Figure 9 is a construction used to explain my method of showing developed surfaces of a propeller.

Figure 1:
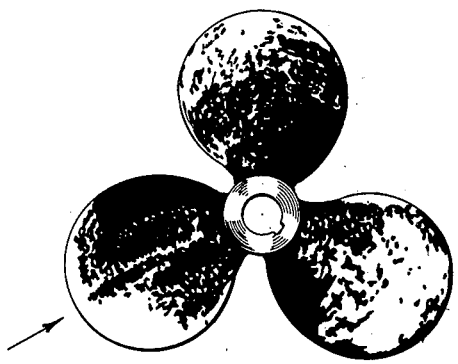
Figure 1 is the representation of a propeller tested in the investigation.

Figure 1 shows the results of a test made on a good grade of propeller of the type now produced. The blades of this propeller were painted with black paint, and the propeller was then used in actual service. This figure shows how the paint was worn, the white portions on the blades being the metal surfaces from which the friction of the water removed the paint. As is indicated, the paint is not worn off smoothly, but is worn off at numerous "high spots" on the blade. About the middle of one of the blades, indicated by the arrow, there is a radially extending "valley" practically unacted upon. The test conclusively showed the presence of the "warts" or high spots discussed in an earlier part of this specification, and shows that the water in passing over such a surface, merely hits the high spots. Thus, the water is impelled by a succession of sudden bumps, rather than by a smooth impelling action.

The bumping action just referred to undoubtedly causes vibration of the propeller and this vibration in turn increases the bumpiness, causing a vicious circle which, it is believed, causes the relatively low efficiency of the screw propeller as now made. With a propeller made in accordance with the present invention, aside from the marked increase in efficiency, there is a decided reduction in vibration, which in itself causes a more efficient action of the propelling mechanism, as well as materially increasing the life and dependability thereof.

Figure 3:
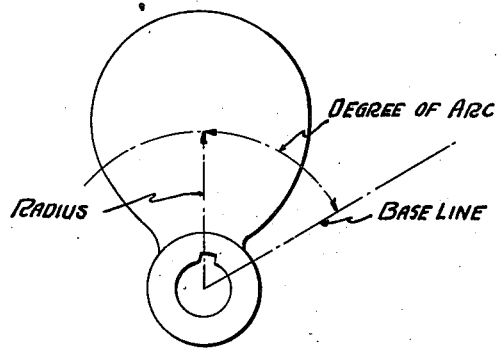
Figure 3 is a diagrammatic sketch showing how the various points plotted were measured.
Figure 2:
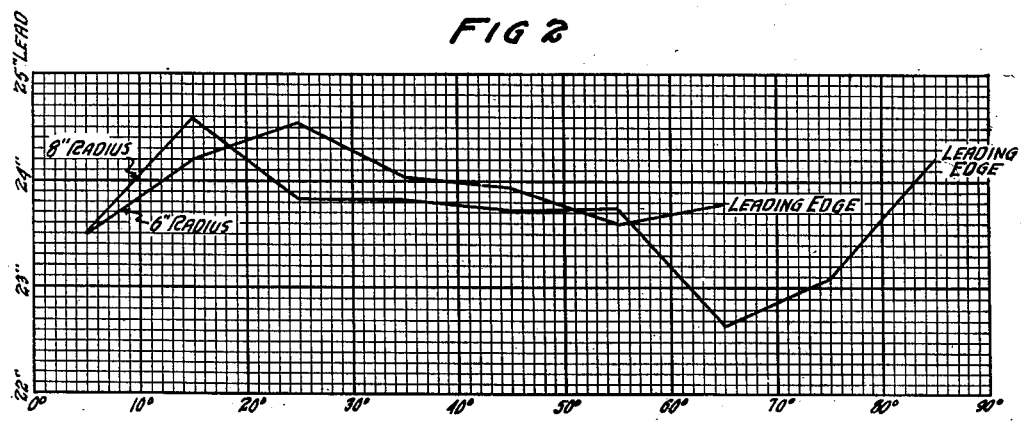
Figure 2 is the graph of the variation in lead at various portions of the surface of a propeller of good grade.

There is another result from the lack of mechanical accuracy in finishing the blades, and this is the wide variation in the lead as determined from various points of the blade. Theoretically, the surfaces of the typical screw propeller is helical, with a certain definite lead. With even the best type of present propeller, however, the lead, as calculated from various points of the surface, varies greatly. Figure 2 is a graph indicating such variation, and Figure 3 shows how the various points were determined. To draw the graph for the points on the three inch radius, the points are determined as being a certain number of degrees from the "base line", which degrees are plotted as abscissæ, and the various leads found for these points respectively, are plotted as ordinates. The graph shows that there is no definitely fixed lead, or any definite variable lead bearing a continuous relation to a helical surface.

The lead on the propeller graphed is merely a hit or miss value varying from about twenty-two and one half inches to twenty-four and one half inches. Such variations mean that the water is impelled at different rates at different parts of the surface, and such action unquestionably causes eddies and other undesirable effects, and decidedly reduces the efficiency of the propeller.

Figure 4:
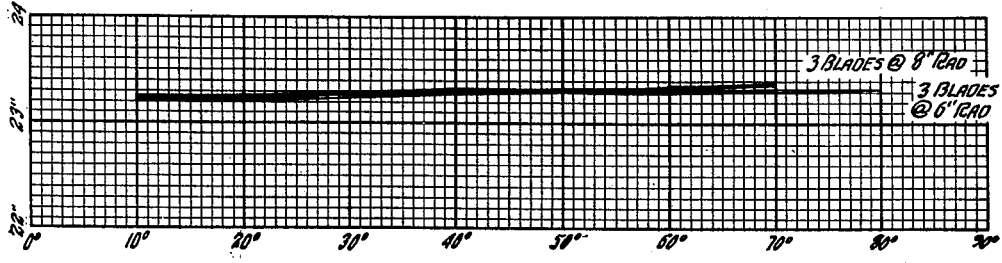
Figure 4 is a corresponding graph of the surfaces of a propeller produced in accordance with my invention.

Figure 4 shows a corresponding diagram of a propeller made according to my invention, and the uniform lead thereof, resulting in a uniform and steady impulsion, is apparent from the diagram.

Thus, it is apparent that the basic feature of my invention is the provision of a regular, even, smooth surface for the blades of a propeller, and a surface which follows, as accurately as possible, the theoretical surface desired. Such a surface I term a wartless surface, and a propeller having such surfaces, a wartless propeller. Both the pushing and pulling surfaces of the blades should be such wartless surfaces.

To provide such a surface, I use a profile grinder of the type disclosed in my application Serial No. 501,155, filed December 8, 1930 and my application Serial No. 517,566, filed February 21, 1931. It is to be understood that those disclosures are hereby made a part of the disclosure of this present application. By such machines, the production of a smooth, uniform, wartless surface may easily be produced by one skilled in the art. Such machines are capable of producing propellers accurate to within ±.003 inch.

The propellers made by such machines have the wartless surface described above, and have the desired lead at all points of the surface of their blade. If desired, by the use of suitable templates, any desired type of surface may be produced on the blades, and such surface will approach the desired theoretical surface to within ±.003 inch.

With regard to the above disclosure, this application is a continuation in part of my application Serial No. 531,784, filed April 21, 1931.

Figure 5 illustrates the arcuate sections which are accurately developed by my method, the arcs described on the propeller blade indicating the cylindrical planes upon which sections are taken. Figure 6 is a typical showing of such developed surfaces.

The basis for the development and location of points on a propeller or other similar surface goes to the fundamental proposition of locating such points and developing a section of the propeller from two reference points. These reference points are as follows:

1. The axis of revolution.
2. A point to or from which all angular measurements are related.

In considering these points, a one plane system of coordinates is used, one quadrant only being employed. The Y-axis is the axis of rotation of the propeller and the X-axis forms what is termed a base line rotatable about the Y-axis upon which is laid off from the origin the radii of points desired to be located.

The base line just referred to is swung about the origin until it is tangent with some point on the trailing edge of the blade, as shown in Figure 5. This point is chosen arbitrarily, and is a point equal to $\frac{7}{10}$ths of the radius of the propeller. All arcuate degrees are measured from the base line in the position last mentioned, the total arcuate angle, as shown in Figure 5, being 108°, this number being also arbitrarily chosen. It should be noted that the base line shown on the left of the propeller blade is dotted, and that on the right, (see Figure 5) is full. It appears that the location of the line on the right, or the full base line, could be positioned at any number of degrees from the leading edge so long as it would not cross any portion of the propeller blade.

Turning now to Figure 6, it will be noted that the base line, which is shown as the X-axis, has plotted thereon various radii, while the Y-axis, the axis of revolution, has plotted thereon the angular degrees from the locating point or the trailing edge of the propeller.

Before giving further discussion in connection with Figure 7, it is thought to be wise to consider what I term the Koff law. I define Koff as equal to $$\frac{\text{lead}}{\pi}.$$

Now if Koff is laid off on the Y-axis, see Figure 8, and a line is drawn through its upper extremity parallel to the X-axis, and a perpendicular is erected upon the base line, or the X-axis, three times as far from the origin as the radius being developed, if a line is drawn through the intersection of the perpendicular to the base line and the parallel to the base line, and through the point on the base line representing the radius chosen, this line will form an angle with the base line equal to the helix angle of the propeller for the particular radius.

This may be proved in the following manner:

$$\text{Tan } \sphericalangle B'A'C = \frac{B'C'}{AC'} = \frac{L}{\frac{\pi}{2R}} = \frac{L}{2\pi R}$$

But tan of helix $\sphericalangle = \frac{\text{lead}}{\text{circumference}} = \frac{L}{2\pi R}$ Hence $\sphericalangle BAC$ = helix $\sphericalangle$.

With reference to Figures 5 and 6, a point on the blade surface is a certain number of degrees from the $\frac{7}{10}$th point on the trailing edge and on the base line at a certain radius. In the example shown, 108° is the maximum number of degrees included between the dotted line through the $\frac{7}{10}$th point and the line indicated as base line on the drawings. On the Y-axis of Figure 6 is plotted the degrees which are later changed into inches (as will be explained below), while on the X-axis the radii in inches are plotted.

A calculation for a point at 50° from the trailing edge for a 4″ radius will be given for a propeller whose lead equals 23″ and whose diameter is 20″.

The following constants should be derived:

$$\text{Koff} = \frac{L}{\pi} = \frac{23}{3.1416} = 7.321 \text{ inches}$$

To change degrees into inches of elevation of the particular point under discussion (i. e. a point 50° from the trailing edge) from the plane of the base line use the following formula:

$$\text{Inches} = \frac{\text{degrees included by blade}}{360} \times L$$

Hence $\frac{L}{360}$ = a constant, and in the example $L = 23$

Hence $\frac{L}{360} = \frac{23}{360} = .0638$ and 50° would $= .0638 \times 50 = 3.19$ inches perpendicular distance between the 50° points and the plane of the base line.

Now with particular reference to Figure 6, suppose information upon a point at 4″ radius and 50° from trailing edge is desired. This would be obtained by the use of the coordinates shown. For full graphic showing see Figure 9. At 4″ radius line B′A would be drawn according to the Koff law so as to make an angle with X-axis equal to the helix angle.

By construction $\sphericalangle B'AC$ = helix angle. Also line B′A represents the developed helix for a four inch radius on the pushing face of the propeller.

Information on a point B at 50° is desired. The 50° distance is plotted on axis of rotation, and a line parallel to base line drawn. The intersection of this parallel with the line B′A locates point B on the pushing face of the propeller.

Of course, by design, the lead of the propeller is known. Hence, line B′A can be drawn. Also by design, and this is important to note, the designer chooses the shape of the pulling surface of the propeller. This is represented by the line AD′ which crosses 50° line at W and whose angle with BA is known by design.

Now draw AY perpendicular to base line and drop the perpendicular BC to base line.

For a 4″ radius and 23″ lead $$\tan \sphericalangle BAC = \frac{23}{2\pi \cdot 4}$$

and $\sphericalangle BAC = 42° 28'$ and $\sphericalangle BAY = 47° 32'$.

Now draw line BD from B perpendicular to AB′ and at D erect DE perpendicular to 50° line. By construction $\sphericalangle DBE = \sphericalangle BAY$ or the complement of the helix angle. (Two angles whose sides are perpendicular each to each are equal.)

Point B, the one desired, has been located on the pushing face of the propeller. The line BD represents "the curve of thickness" and line ED "the curve of surface".

Obviously other sections along the 4″ radius at different degrees may be determined, as for example, a section at 25° and one at 62° 30′. Hence a designer will know at a glance what any section along any radius will look like.

The calculations may be summarized as follows:

*Calculations for a point on 4″ radius at 50° for L = 23″*

As pointed out $\frac{L}{360}$ = a constant.

Hence $\frac{L}{360} = \frac{23}{360} = 1.0638$ and since inches $$= \frac{\text{degrees included by blade}}{360} \times L, \text{ the } 50° \text{ line}$$

is $50 \times 0.0638$ inch or $3.19$ inches above the X-axis. Therefore, $BC = 3.19$ in.

For a $4''$ radius and lead of $23''$ tan of helix ∡ =

$$\text{Tan } BAC = \frac{L}{2R} = \frac{23}{2 \times 3.1416 \times 4}$$

$$\angle BAC = 42° \ 28'$$

and $$\sin \angle BAC = 0.67516$$

Also $$\angle BAY = 90° - 42° \ 28' = 47° \ 32'$$

and $$\sin \angle BAY = 0.73767$$

Now in △ BAC the ∡ BAC is known and BC is known.

Hence $$\sin \angle BAC = \frac{BC}{AB}$$

$$AB = \frac{BC}{\sin \angle BAC}$$

$$AB = \frac{3.19}{.675} = 4.73 \text{ inches}$$

$$\cot \angle BAC = \frac{AC}{BC}$$

$$AC = \cot \angle BAC \times BC = 1.09 \times 3.19 = 3.48 \text{ inches.}$$

In the △BAD by design the ∡ BAD is known.

Assume $\angle BAD = 6° \ 17' \ 25''$
Also AB has been calculated.

Hence $$\tan \angle BAD = \frac{BD}{AB}$$

$BD = \tan 6° \ 17' \ 25'' \times 4.731 =$
$\quad\quad 0.10949 \times 4.731 = 0.518$ inches In BED the $DBE = BAY = 47° \ 32'$ and BD is known.

Hence $$\sin DBE = \frac{ED}{BD}$$

$ED = BD \times \sin DBE = .518 \times .737$
$\quad\quad = .382$ inch.

As previously pointed out, HD, the developed or expanded length of the helix ($4''$ radius)

$$= \frac{L}{\sin \text{ helix}} = \frac{L}{\sin BAC} = 34.1 \text{ inches}$$

and $$\frac{\text{expanded length}}{360} = \frac{34.1}{360} = 0.0946 \text{ inch.}$$

In summation, the following table shows the lengths calculated and the known quantities needed for calculation of the point selected (i. e., a point at $50°$ on a $4''$ radius):

| Lead | 23 inches | ∡BAD | 6° 17′ 25″ |
|---|---|---|---|
| Radius | 4 inches | Tan ∡BAD | 0.10949 |
| Degrees of the point | 50° | BC | 3.19 inches |
| Distance point from origin | 3.19 inches | AB | 4.73 inches |
| Koff | 7.321 inches | AC | 3.48 inches |
| Helix angle ∡BAC | 42°–28′ | BD | 0.518 inch |
| Sin ∡BAC | 0.675 | ED | 0.382 inch |
| Complement of helix ∡BAY | 47° 32 | Expanded length | 34.1 inches |
| Sin ∡BAY | 0.737 | $\frac{\text{Exp. length}}{360}$ | 0.0946 inches |

Obviously the above can be figured out for any number of points desired.

Figure 6 is, accordingly, a showing of the developed sections indicated in Figure 5. The pushing face of such sections in Figure 6 is determined by the Koff law as explained above. The pulling face is arbitrarily chosen by the designer.

In the foregoing, it has been stated that the line AD represents the developed pulling surface of the blade. Many designers however, like a pulling surface which results in a developed section having the appearance of a segment of a circle. Such a design is shown in Figure 7 and is also given below.

Again choosing a point B at $50°$ on a $4''$ radius it may be located on the pushing face of the propeller in a manner like that described. To locate points on the pulling face, however, a construction such as Figure 7 must be made.

With reference to the summation given above, $AB = 4.731$ inches; $BD = .518$ inch; $\angle DAB = 6° \ 17' \ 25''$, and $$\sin 6° \ 17' \ 25'' = 0.10957.$$

In △ DAB $$\overline{AD}^2 = \overline{AB}^2 + \overline{BD}^2, AD = \sqrt{4.731^2 \ 0.518^2}$$

$$AD + \sqrt{22.4 + .269} = 4.76 \text{ in.}$$

Continue BD to left of B. Bisect AD at $\epsilon$, erect the perpendicular $\epsilon\omega$ and continue the same until it cuts the continuation of BD at $\omega$. Then draw $\omega$A.

By construction $$A\epsilon = \epsilon D = \frac{1}{2}AD = \frac{4.76}{2} = 2.38 \text{ inches,}$$

and in the △s D$\omega\epsilon$ and A$\omega\epsilon$, the side $\omega\epsilon$ is common, the sides A$\omega$ and D$\omega$ are equal radii and $A\epsilon = \epsilon D$. Hence the △s are equal and therefore $\angle D\omega\epsilon = \epsilon\omega A$.

Now $\angle D\omega\epsilon = \angle DAB$ (2 ∡s whose sides are perpendicular are equal) and $$\sin \angle D\omega\epsilon = \frac{D\epsilon}{D\omega}$$

$$D\omega = \frac{D\epsilon}{\sin \angle D\omega\epsilon}$$

$$D\omega = \frac{.5 \ AD}{\sin \angle DAB} = \frac{2.38}{0.10957} = \frac{1.18}{0.10957} = 21.75 \text{ in.}$$

With $D\omega$ as a radius, the pulling surface of the propeller may be drawn.

To determine any point on this pulling surface, draw from $\omega$ the line $\omega\phi$ making any desired $\angle$ with $\omega\epsilon$ say an $\angle$ of 2°. $\phi$ represents any point on the arc AD and it is desired to locate this point as well as other points on the arc.

Since $\angle \phi\omega\epsilon$ by assumption = 2°, the $$\angle D\omega\phi = \angle D\omega\epsilon - \angle \phi\omega\epsilon$$

and $$\angle D\omega\epsilon = 6°\ 17'\ 25'' - 2° = 4°\ 17'\ 25''$$

$$\angle D\omega\phi = \angle \omega\phi\psi = 4°\ 17'\ 25''$$

In $\triangle \omega\phi\psi$, $\cos \angle \omega\phi\psi = \dfrac{\phi\psi}{\phi\omega}$ $\phi\psi = \phi\varpi \cos \angle \varpi\phi\psi = 21.75 \cos 4°\ 17'\ 25''$
$\phi\psi = 21.75 \times 0.99720 = 21.63$ inches
$D\varpi = 21.75$ inches and $D\varpi - DB = 21.75 - .518 = 21.232$ inches, and $D\varpi - DB = B\varpi = A\eta = 21.232$ inches. $\phi\psi - A\eta = \phi\theta$
$\phi\theta = 21.63 - 21.232 = 0.398$ inch.

or $$\overline{\eta\omega}^2 + \overline{A\eta}^2 = \overline{A\omega}^2$$

$$A\eta = \sqrt{\overline{A\eta}^2 - \overline{\eta\omega}^2} = \sqrt{21.75^2 - 4.731^2}$$

$$= \sqrt{480 - 22.4} = \sqrt{457.6} = 21.2 \text{ inches.}$$

The $\angle$ DA$\phi$ is measured by ½ the arc D$\phi$. (An inscribed angle is measured by ½ its intercepted arc.) But the arc D$\phi$ is also subtended by $\angle$D$\varpi\phi$ which is equal to 4° 17′ 25″.

Hence $\angle DA\phi = \dfrac{4°\ 17'\ 25''}{2} = 2°\ 8'\ 43''$ and the $\angle BA\phi = \angle DAB + DA\phi = 6°\ 17'\ 25'' + 2°\ 8'\ 43'' = 8°\ 25'\ 8''$.

In $\triangle \phi\theta A$, $\sin \angle \phi A\theta = \dfrac{\phi\theta}{\phi A}$ $$\phi A = \dfrac{\phi\theta}{\sin \angle \phi A\theta} = \dfrac{398}{\sin 8°\ 26'\ 8''} = \dfrac{0.398}{.1467}$$

$\phi A = 2.75$ inches.
Now $\angle BAC = $ helix $\angle = 42°\ 28'$.
Hence $\angle \phi AC = \angle BAC - \angle \theta A\phi$
$= 42°\ 28' - 8°\ 26'\ 8'' = 34°\ 1'\ 52''$.

In $\angle \phi AC$, $\sin \phi AC = \dfrac{\phi C}{\phi A}$ $\phi C = \phi A \sin \angle \phi AC$
$= 2.715 \sin 34°\ 1'\ 52''$
$= 2.715 \times .55965 = 1.518$ inches $$\overline{AC}^2 + \overline{\phi C}^2 = \overline{\phi A}^2$$

$$\phi C = \sqrt{\overline{\phi A}^2 - \overline{AC}^2}$$

$$= \sqrt{2.715^2 - 1.518^2}$$

$$= \sqrt{7.38 - 2.30}$$

$$= \sqrt{5.08}$$

$\phi C = 2.255$ inches.

The coordinates of the point $\phi$ have been located. Obviously other points on the arc AD may be similarly located by varying the angle $\phi\varpi\epsilon$ so that the curve of the back surface of the propeller will be completely described.

From the above constructions, it is apparent that I have provided a method whereby any number points upon the surface of a propeller may be fully located and whereby the arcuate sections of a propeller may be accurately shown. By such means the machine tools for producing a propeller may be accurately set and operated. With machines such as are disclosed in my applications Serial Nos. 501,155 and 517,566, above referred to, the form and proper placing of the templates may be accurately determined.

Similarly, the accuracy of an actual propeller may be checked by comparison to its theoretical surface as determined by my method. It is possible, for instance, to establish certain tolerances in such work, which insures the obtaining of a propeller accurate to within the minimum limits obtainable by careful machining, and the obtaining of a wartless surface, such as I have described previously in this specification. Such surface may thereafter be checked by the above means to determine whether it is within the tolerance set, and whether it is accordingly a true wartless surface.

While I have shown and described the preferred embodiment of my invention, I wish it to be understood that I do not confine myself to the precise details set forth, by way of illustration, as it is apparent that changes, variations therein and other applications thereof may be made by those skilled in the art, without departing from the spirit of the invention or exceeding the scope of the claims.

I claim:

1. The method of determining the shape of an arcuate section of any desired radius of a propeller blade which comprises constructing a developed section thereof correlated to a vertical axis indicating degrees of arc and distance parallel to the axis of rotation, and to a horizontal axis indicating length of radius and distance measured arcuately about the axis of rotation, determining the pushing face of said section by connecting a point distant three radii from the vertical axis and distant an amount equal to the lead of the propeller divided by $\pi$ from the horizontal axis with a point in the horizontal axis distant one radius from the vertical axis, locating the points of such section at the leading and trailing edges of the propeller in said pushing face, and constructing the pulling face of the propeller in any desired manner.

2. The method of determining the shape of a number of arcuate sections of a propeller blade in the manner specified in claim 1.

3. The method of producing a propeller blade which comprises successively machining circumferential portions of it to simulate corresponding sections determined as in claim 1.

4. The method of checking the accuracy of a propeller which comprises comparing the actual propeller to sections determined as in claim 1.

5. The method of determining the shape of an arcuate section of any desired radius of a propeller blade as in claim 1, and in addition, the steps of determining the pulling face of said section having a given thickness at its middle point, comprising determining the radius of a circle that would pass through the leading and trailing points of said section and the mid-point of said pulling face and drawing an arc of said radius through said leading and trailing points and said mid-point, to constitute the pulling face of said section.

6. The method of producing a wartless propeller which comprises determining the shape of a number of arcuate sections thereof correlated to a vertical axis indicating degrees of arc and distance parallel to the axis of rotation, and to a horizontal axis indicating length of radius and distance measured arcuately about the axis of rotation, by determining the pushing face of said sections by connecting, for each face, a point distant three radii from the vertical axis and distant an amount equal to the lead of the propeller divided by $\pi$ from the horizontal axis with a point in the horizontal axis distant one radius from the vertical axis, locating the points of such section at the leading and trailing edges of the propeller in said pushing face, and constructing the pulling face of the propeller in any desired manner; machining the propeller to reproduce in it the sections so calculated, and checking the propeller by comparing actual measurements thereof to the desired values obtained in the developed sections, the tolerance for the actual lead obtained in such checking to be within four per cent of the theoretical lead.

In testimony whereof I affix my signature.

CHARLES H. A. F. L. ROSS.